United States Patent [19]

Johnson et al.

[11] Patent Number: 4,457,581
[45] Date of Patent: Jul. 3, 1984

[54] PASSIVE FIBER OPTIC DATA BUS CONFIGURATIONS

[75] Inventors: Derwyn C. Johnson, Ottawa; Brian S. Kawasaki, Carleton Place; Kenneth O. Hill, Kanata, all of Canada

[73] Assignee: Her Majesty the Queen in right of Canada, as represented by the Minister of National Defence of Her Majesty's Canadian Government, Canada

[21] Appl. No.: 315,369

[22] Filed: Oct. 27, 1981

[30] Foreign Application Priority Data

Nov. 26, 1980 [CA] Canada .................................. 365491

[51] Int. Cl.$^3$ ............................................... G02B 5/14
[52] U.S. Cl. .................................. 350/96.16; 455/612
[58] Field of Search .......................... 350/96.15, 96.16; 455/610, 612

[56] References Cited

U.S. PATENT DOCUMENTS 4,017,149 4/1977 Kao ................................... 350/96.16
4,166,946 9/1979 Chown et al. ................ 350/96.16 X
4,330,170 5/1982 Johnson et al. .................. 350/96.16

OTHER PUBLICATIONS

Rawson et al., "Bitaper Star Couplers with up to 100 Fibre Channels," *Electr. Lett.*, vol. 15, No. 14, Jul. 1979, pp. 432–433.
Johnson et al., "Fused Biconical Tapered Fiber-Optic Devices . . . ," *Fiber and Int. Optics*, vol. 3, Nos. 2–3, 1980, pp. 263–284.
Gravel et al., "Asymmetrical Star Coupler for Optical Fiber Systems," *Appl. Optics*, vol. 20, No. 15, Aug. 1981, pp. 2735–2737.

*Primary Examiner*—John D. Lee
*Attorney, Agent, or Firm*—Larson and Taylor

[57] ABSTRACT

Disclosed are optical data bus configurations for interconnecting terminals so that any terminal can communicate with any other terminal. It is known to do this by connecting terminals serially using two trunk optical fibers and to connect terminals together in a star configuration using a single transmission star or reflection star. The serial network is limited by optical loss while the star network requires more optical fiber and is more costly. Disclosed is a serial bus which uses six fibers arranged in two groups of 3 each, the groups conducting light in mutually opposite directions. A transmitting means in each terminal is coupled to two of the fibers in each group and terminals adjacent any one terminal are connected to a different two fibers than the one terminal. Another arrangement disclosed uses hybrid reflection-transmission star couplers. Terminals can be connected to reflection ports of the hybrid couplers, while the couplers can be interconnected by the transmission ports thereof. A relatively small number of fibers are required to interconnect a large number of terminals.

5 Claims, 13 Drawing Figures

T = TRANSMITTER
R = RECEIVER

FIG. 1
FIG. 2

T = TRANSMITTER
R = RECEIVER

PASSIVE FIBER OPTIC DATA BUS CONFIGURATIONS

This invention relates to optical data buses for interconnecting terminals.

One known method for interconnecting a number of terminals using optical fibers involves connecting the terminals together serially using two trunk optical fibers. At each terminal location, light is coupled onto or off the fiber using optical fiber access couplers. The number of terminals that can be connected together using the serial network is severely limited by optical loss. The factors contributing to the optical loss are coupler access loss, splice losses and connector losses.

It is also known to interconnect terminals in a star configuration using a single transmission star or a reflection star. If a reflection star is used, bidirectional operation is obtained by using access couplers at each terminal location. The star network is peferable to serially connecting the terminals because the optical loss in db increases logrithmically with the number of terminals compared to the linear increase that occurs in serial configurations. The implementation of a star network, however, requires more optical fiber and it also may have a greater installation cost.

According to one aspect of the present invention, there is provided a serial data bus for interconnecting a plurality of terminals comprising six optical fibers arranged in two groups of three fibers each, the groups conducting light in mutually opposite directions. Each terminal has light transmitting and receiving means connected to predetermined fibers by optical couplers. The transmitting means in each terminal is connected to two of the fibers in each group of three fibers, terminals adjacent to any one terminal being connected to a different two fibers than the one terminal. In other words, the set of two fibers that is selected varies from one terminal to the next. As a result, the number of splices and couplers in a single optical path between the terminals at opposite ends of the data bus is reduced compared with the two fiber data bus.

According to another aspect of the invention, there is provided an optical data bus for interconnecting a plurality of terminals comprising a plurality of hybrid transmission-reflection star couplers each having M transmission ports and N reflection ports, terminals having transmitting and receiving means being optically coupled to at least some of the reflection ports and each of the hybrid star couplers being connected to the other star coupler by a different one of said M transmission ports.

For example, M may be 2 and N may be 8 in which case three hybrid transmission-reflection star couplers may interconnect 24 terminals.

The invention will now be further described in conjunction with the accompanying drawings, in which.

Figure 1:
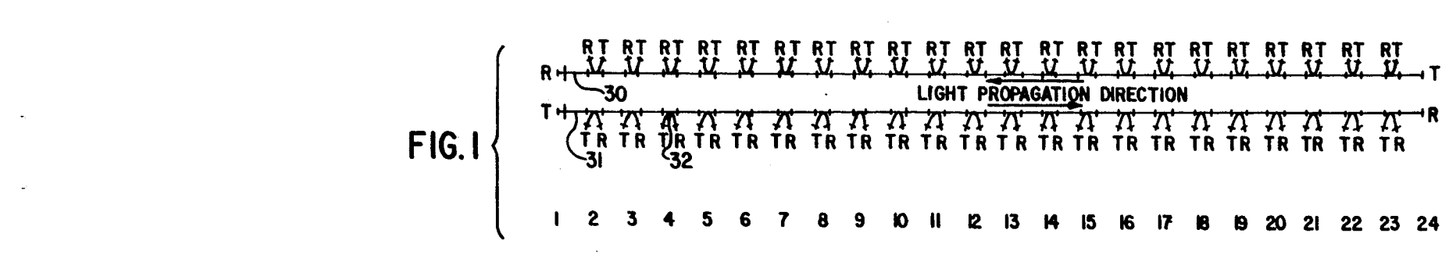
FIG. 1 is a diagram of a known two fiber serial data bus.

FIG. 1 of the drawings shows the simplest data bus topology, namely the series or linear bus. FIG. 1 is a schematic diagram of a linear network interconnecting twenty four terminals, 1–24, by means of a cable containing two optical fibers 30 and 31. Except for the terminals at the ends of the cable, access to the data bus is by access couplers 32. Thus, as shown in FIG. 1, each terminal interface requires two access couplers, two transmitters and two receivers. In this network, bidirectional communication is achieved by using two optical fibers 30 and 31 sending signals in opposite directions.

Since bidirectional light propagation in a single fiber is also possible, a linear data bus could be implemented using a cable containing a single optical fiber strand. Then the number of opto-electronic components required in each terminal interface is also reduced by a factor of 2. However, the implementation of bidirectionality in a single line requires the use of 3 dB splitters at the transmitters and receivers thereby increasing the optical loss between terminals by 6 to 8 dB depending upon the efficiency of the splitter. Since the principal limitation on the number of terminals that can be interconnected in a linear configuration is optical loss, the use of two optical fibers has been preferred.

The number of terminals that can be connected together using the serial network of FIG. 1 is limited by optical loss. The factors contributing to the optical loss are coupler access loss, splice losses and interconnection losses.

Figure 2:
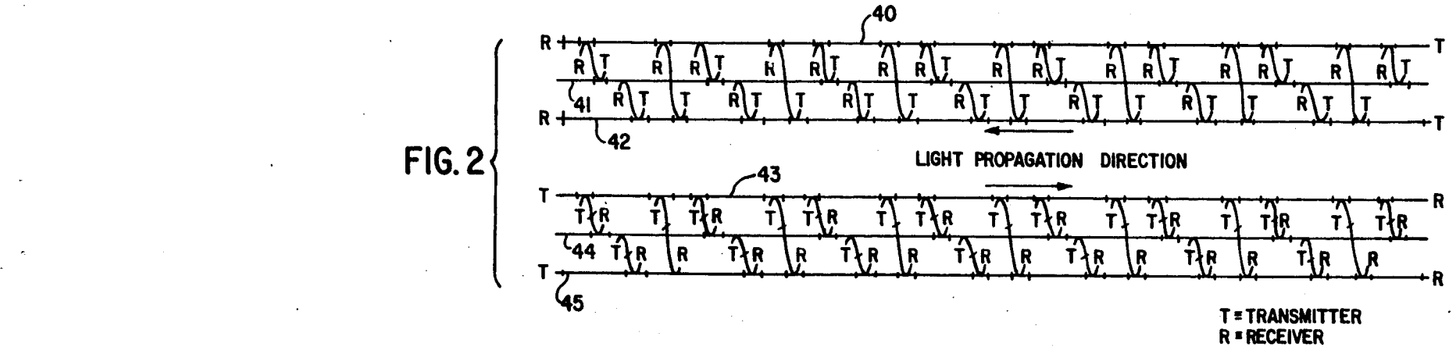
FIG. 2 is a diagram of a six fiber serial data bus according to the invention.

FIG. 2 schematically illustrates a serial data bus configuration according to the invention in which the trunk consists of six fibers 41 to 45, rather than two as in the conventional serial network shown in FIG. 1. Fibers 40 to 42 are used for light propagation in one direction while fibers 43 to 45 are used for light propagation in the opposite direction. By inspection of FIG. 2, it can be seen that any one transmitter T is used to drive two of three fibers and the set of two fibers that is selected varies from one terminal to the next. As a result, the number of splices and couplers in a single optical path between the terminals at opposite ends of the data bus is reduced compared to the two fiber data bus.

Figure 3:
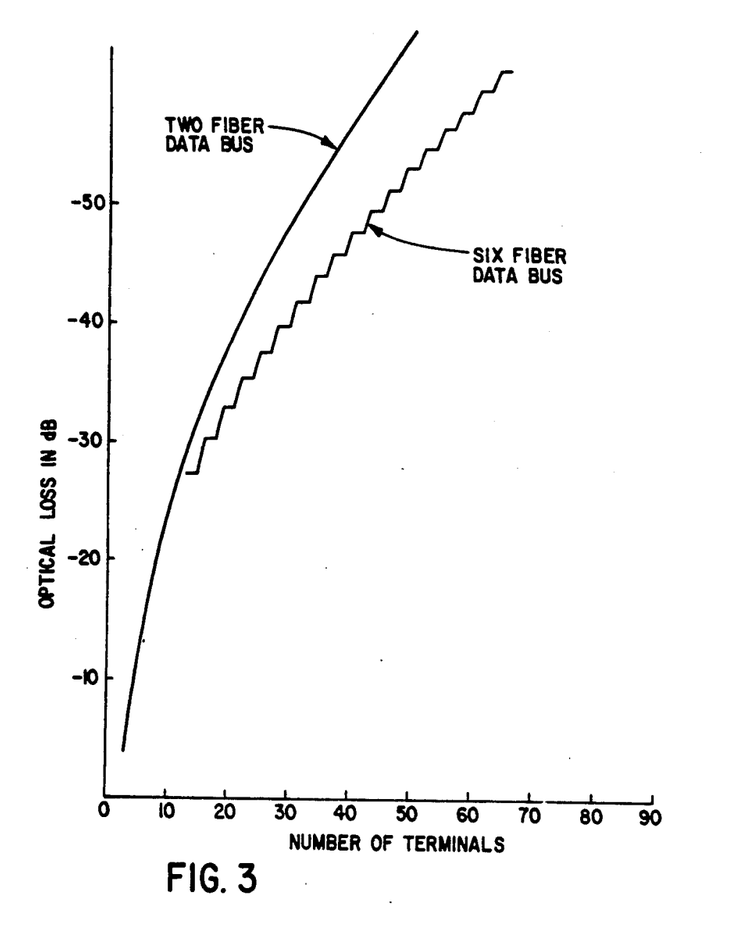
FIG. 3 comprises graphs comparing the two fiber data bus with the six fiber data bus.

FIG. 3 shows a plot of the maximum optical loss as a function of the number of terminals interconnected by the data bus. All the access couplers forming the data bus are assumed to have the same coupling coefficient and access loss. However, for a given number of terminals, the magnitude of the coupling coefficient is chosen to minimize the maximum optical loss. For the particular case shown in FIG. 3, the optical loss for the six fiber data bus is lower than the two fiber bus for systems interconnecting more than 13 terminals. The access couplers in both systems are assumed to have the same access loss.

The six fiber bus does have more complexity than the two fiber bus, i.e. four more fibers in the cable and two more access couplers at each terminal location. Also, the existence of multiple optical paths between some terminals may result in pulse distortions at high data rates.

Figure 4:
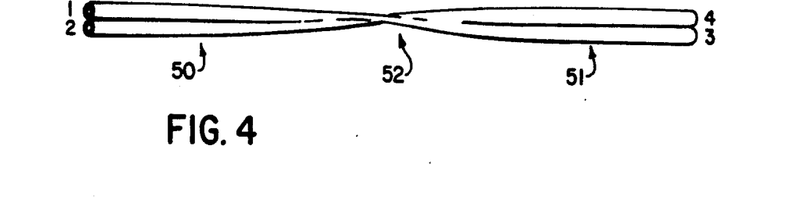
FIG. 4 is a diagram of a symmetric access coupler.
Figure 5:
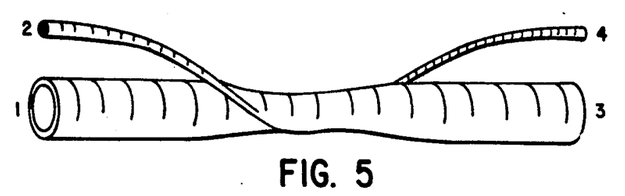
FIG. 5 is a diagram of an asymmetric access coupler.
Figure 11:
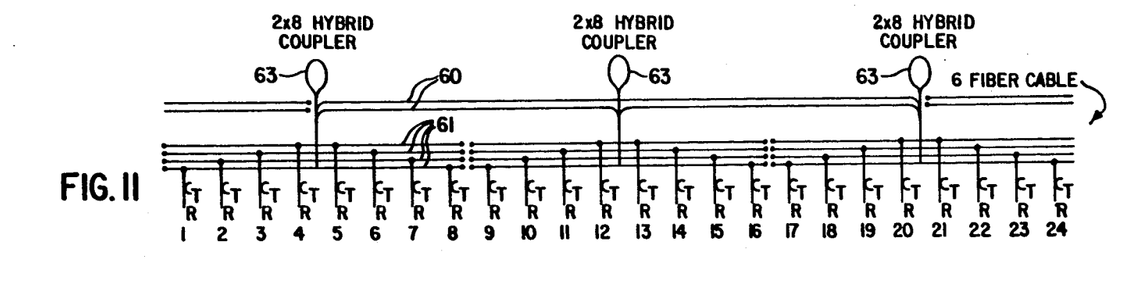
FIG. 11 is a diagram of a data bus according to the invention using hybrid reflection-transmission star couplers, FIG. 12 comprises plots comparing the number of fibers vs terminals for a reflection star configuration as compared to a hybrid reflection-transmission configuration, and FIG. 13 comprises curves illustrating optical losses for various configurations.

FIGS. 4 and 5 illustrate access couplers which may be used in the embodiment of FIG. 2 as well as in the embodiment of FIG. 11 to be described later.

FIG. 4 illustrates a 4-port symmetric access coupler utilizing a biconical tapered structure. It consists of two sections of fibers 50 and 51 biconically tapered and fused together in a region 52 about the taper waists. Light launched in the port 1 arm propagates in the manner of core-guided guided modes to the decreasing tapered section of that arm. Here the higher modes exit from the core because the decrease in the dimensions of the core correspond to a decrease in the number of modes it can support. This portion of the light which escapes the core is guided as cladding modes of the double biconical tapered structure, and it tends to distribute itself uniformly through this structure. When this light reaches the expanding tapered regions of ports 3 and 4, the expanding core regions recapture it approximately equally in the two ports as core-guided modes again. The total amount of light in fiber arm 3 is greater than that in arm 4, however, since arm 3 also contains that portion of the total light which did not escape the core but propagated directly to port 3.

The action of the coupler depends on a number of parameters such as type of fiber (step or graded index), fiber numerical aperture, ratio of diameter of fiber-core at taper waist to original fiber-core diameter, angles of down and up tapers, fusion length and ratio of cladding diameter to fiber-core diameter. For example, couplers with a low loss are usually obtained using step-index fiber with a high numerical aperture, a large core and a thin cladding. The performance of the coupler can also depend on the choice of source, light emitting diode or laser diode, and also on the location of the coupler within the link with respect to other couplers or link components. These considerations for the system designer are common to most coupling structures.

Depending on the type of fiber used, biconical fiber couplers can be made with a low coupler loss (5%) and a wide range of coupling ratios (5% to 45%).

Further versatility of optical routing can be achieved with the more complex version of the access coupler, the optical power combiner or asymmetric access coupler shown in FIG. 5. As shown in FIG. 5, this device is made using two pieces of fiber which are not identical; the fibers differ in some physical characteristic such as size, numerical aperture or cross section. The device operates as an asymmetric access coupler in which the dividing of light can be biased in favour of one arm of the device in a controllable fashion.

Figure 6:
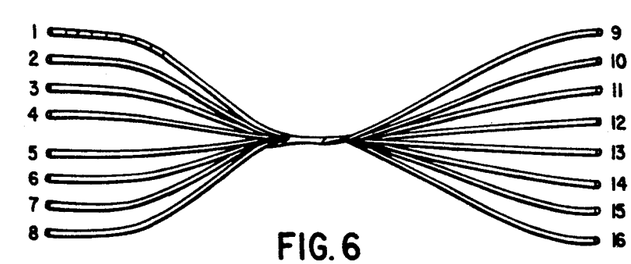
FIG. 6 is a diagram of a transmission star coupler.

Three different types of multiport branching devices, the transmission star coupler, the reflection star coupler and the hybrid transmission-reflection star coupler can be fabricated by simple extension of the biconical tapered fiber structures described above. In the transmission star coupler N pieces of fibers are employed resulting in a device with 2N ports. Such a device is called an N×N transmission star to denote the fact that N ports are used for light input and the other N ports are used for light output. FIG. 6 depicts an 8×8 transmission star. A numbering convention for labelling the ports in FIG. 6 has been adopted so that port i and port N+i denote respectively the two ends of the original single piece of fiber.

These star couplers can be made with a large number of ports thereby permitting the interconnection of many terminals. Transmission star couplers have been fabricated using N=4, 7, 19, 37 and 100 fibers. In the case of 100×100 transmission stars, the coupler efficiency E ranged from −0.6 to −2.4 dB. The self coupled power is estimated to be 7 to 15 times the cross coupled power. It is estimated that the effective coupler efficiency = −3 dB for a 100×100 transmission star.

Figure 7:
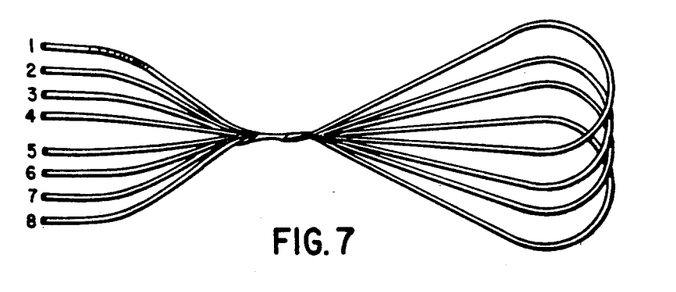
FIG. 7 is a diagram of a reflection star coupler.

The fused biconical taper techniques can also be used to make reflection star couplers. The reflection star is made in the same fashion as the transmission star except the pieces of fibers are formed into loops before fusing and tapering. Thus the use of N fiber loops results in a device with 2N ports. FIG. 7 is a schematic diagram of an 8 port reflection star. The ports in FIG. 7 are labelled such that port i and N+i correspond to the ends of the same fiber loop. Unlike the transmission star, the input ports of the reflection star are also the output ports. The most useful form for the reflection star is one in which all the coupling coefficients $m_{ij}(i, j=1$ to $2N)$ are approximately equal. An eight port reflection star has been fabricated using four loops of Corning step index fiber. The effective efficiency of this reflection star is −1.5 dB.

Figure 8:
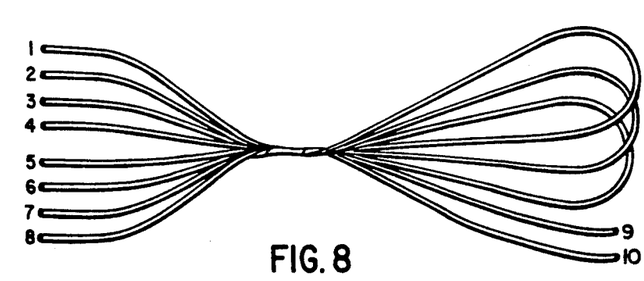
FIG. 8 is a diagram of a 2×8 transmission-reflection hybrid coupler.

The procedures used to make transmission and reflection stars can be used to construct hybrid transmission-reflection stars. This device has some ports which function like transmission ports and others which function like reflection ports. We will call a hybrid coupler which has A transmission ports and B reflection ports an A×B hybrid coupler. FIG. 8 is a schematic diagram of a 2×8 transmission-reflection hybrid coupler. Hybrid couplers are particularly useful in assembling distributed star networks because they can eliminate problems of multiple signal paths which can occur when interconnecting several star couplers.

As data bus interconnects a number of spatially separated data terminals to permit any one terminal to communicate with any other terminal. It consists of a transmission medium, a mechanism for control of transmission over the medium and an interface at each terminal location to provide a means for accessing the data bus. Although the terminals are spatially separated the data bus network is usually confined to a local area such as a building, adjacent buildings, ship, aircraft or shelter. Thus the physical length of the transmission medium is generally <1 km. Data bus networks have several advantages over other network topologies such as point-to-point links in these applications. Most importantly, a data bus can make possible the interconnection of a set of terminals when the number of terminals is so large that interconnection through individual point-to-point links becomes impractical. Moreover, a data bus topology can provide considerable configurational flexibility; for example, terminals can be added to the network or moved to different locations without major revisions in the cabling layout. Both of these advantages are of particular importance in applications in which cable installation is the dominant system cost, for example in shipboard applications.

Figure 9:
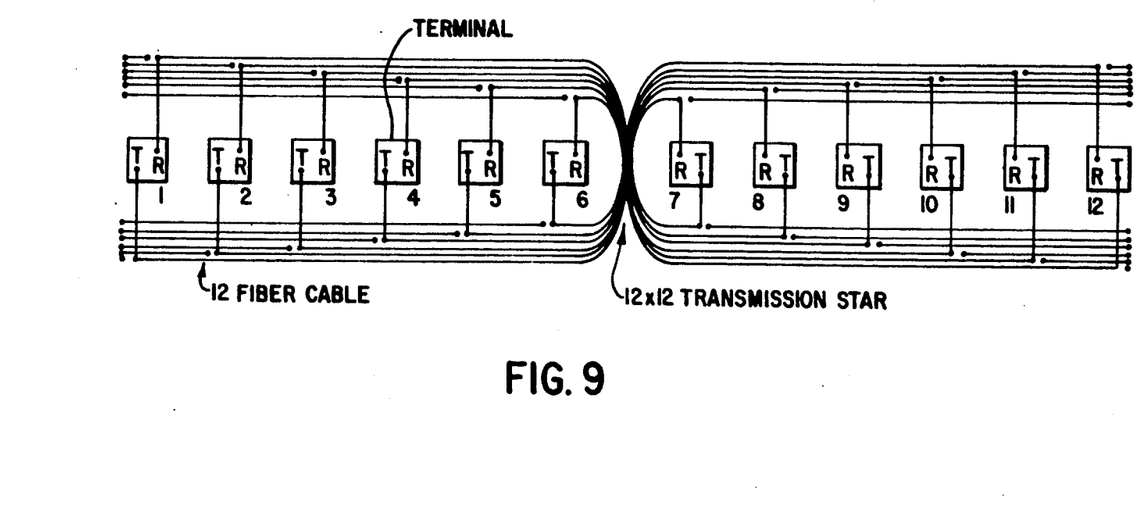
FIG. 9 is a diagram of a transmission star network.

Star data bus configurations can be an improvement over linear configurations for interconnecting many terminals principally because the maximum optical loss in dB increases only logarithmically with the number of terminals whereas in a serial network the increase is linear. This benefit comes however at considerable cost. The disadvantages of star networks in comparison to linear networks are a requirement for more optical fiber, higher installation costs and a reduced flexibility to future data bus modifications or expansions. The latter two of these disadvantages can to some extent be overcome by linking all the terminals together with a single optical fiber cable in the same fashion as a linear network. This cable would, however, contain a sufficient number of fibers to permit the terminals to be connected as a star network. An example of this arrangement is shown in FIG. 9 which illustrates the interconnection of 12 terminals using a 12 fiber cable and a single 12×12 transmission star. The installation of each terminal requires the use of only two of the fibers in the cable. The pieces of these two fibers beyond the coupler terminal connection reside in the cable unused. However these unused fiber sections are available for use should the terminal be relocated. With the configuration shown in FIG. 9, the cable layout for the star network is identical to that of the linear network and therefore the installation costs should be equivalent except for the requirement to make more splices in the assembly of the star network. The flexibility of this star network to modifications is also only slightly less than the linear network. The principal restriction is that the number of terminals on one side of the star coupler cannot exceed one half the number of fibers in the cable.

Figure 10:
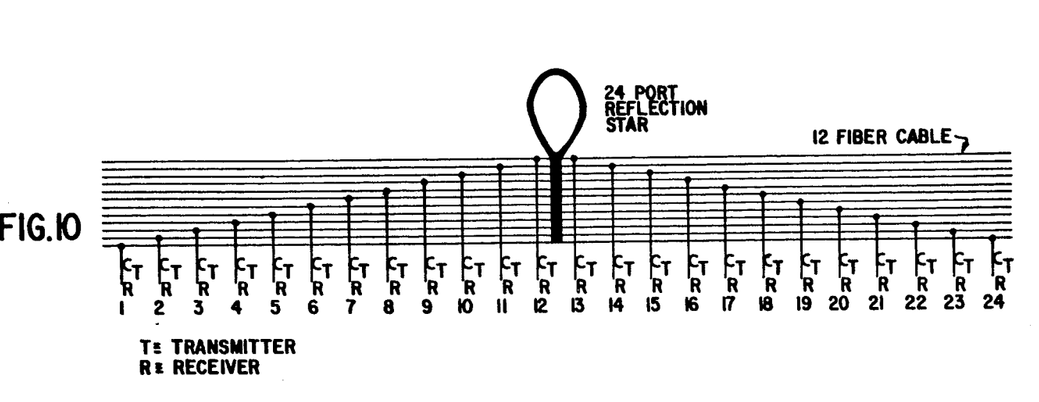
FIG. 10 is a diagram of a data bus configuration using a 24 port reflection star.

The single transmission star network in FIG. 9 requires a fiber cable containing $N_T$ fibers to interconnect $N_T$ terminals. Thus for a large number of terminals, the cable may become unwieldy motivating the consideration of star network configurations which require less fiber. FIG. 10 illustrates the interconnection of 24 terminals using a single 24 port reflection star. Since light propagation in the fibers is bidirectional, the number of fibers required in the cable is reduced by a factor of two in comparison to the single transmission star network of FIG. 9 for the same number of terminals. Alternatively, for the same number of fibers, the reflection star can accommodate twice as many terminals as the transmission star. Bidirectional transmission is achieved by means of an asymmetric coupler or a −3 dB symmetric access coupler located in each terminal interface.

The amount of fiber required in star networks can be significantly reduced by grouping the terminals under a number of stars each of which has a small number of ports and then interconnecting these stars. The difficulty is to interconnect the star couplers so that there is only one optical path between any two terminals. This result can be achieved by use of hybrid star devices such as shown in FIG. 8. FIG. 11 is a schematic diagram showing a technique according to the invention for interconnecting 24 terminals using three 2×8 hybrid star couplers for which there is only one optical path between any two of the terminals 1-24. The terminals are connected to the reflection ports of the hybrid couplers. Like the single reflection star network, asymmetric couplers or −3 dB symmetric couplers are required in each terminal interface to permit bidirectional light propagation. The transmission ports 60 of the hybrid couplers 63 are interconnected so that light propagating between any two terminals passes through at most two hybrid couplers. The advantages of this configuration are apparent in that the number of fibers required in the cable is 6 compared to the 12 and 24 fibers required respectively for the single reflection star and transmission star networks.

A feature of the hybrid couplers is that they can be connected together without creating multiple optical fiber paths between the terminals. FIG. 11 shows the arrangement for connecting together three 2×8 hybrid couplers to interconnect 24 terminals. The transmission ports are used to interconnect the hybrid couplers and the reflection ports are connected to access couplers located in the terminals. The hybrid coupler configuration in FIG. 11 requires only a 6 fiber cable compared to the 12 fibers required in the single reflection star configuration shown in FIG. 10.

Figure 12:
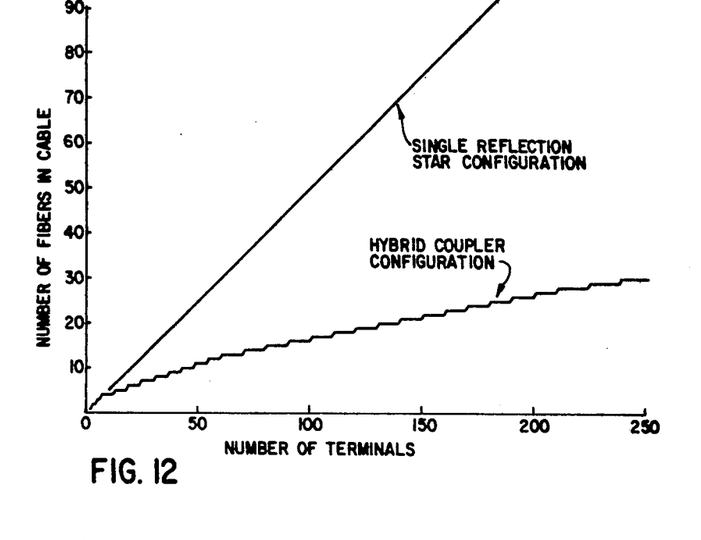

FIG. 12 is a plot of the number of fibers required in the cable to implement a data bus using the single reflection star configurations or the hybrid coupler configuration as a function of the number of terminals. Note that for 200 terminals the single reflection star requires 100 fibers compared to the 26 fibers required in the hybrid coupler configuration. The reduction in the number of fibers in a cable in hybrid configuration is accompanied by an increase in the maximum loss between two terminals.

Figure 13:
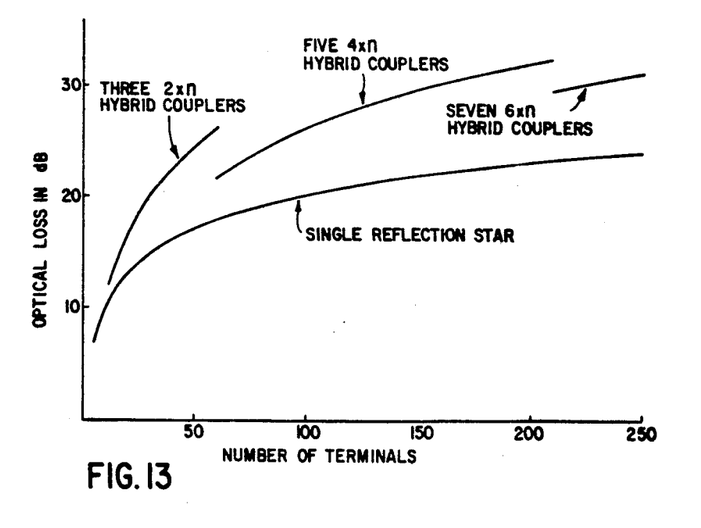

FIG. 13 is a plot of the optical loss for the two configurations (hybrid, single reflection star) as a function of the number of terminals interconnected. Only that portion of the optical loss resulting from power splitting is shown in FIG. 13. The splice losses, star coupler access losses and access coupler losses for the two configurations are similar. For 200 terminals, the hybrid coupler configuration has a 10 dB greater loss compared to the reflection star. The increase in loss is not considered significant in view of the large reduction in the amount of fiber required to implement hybrid coupler data bus networks according to the invention.

The hybrid configurations also offer a potential advantage over single star networks in installation difficulty. The geometry of the hybrid star network in FIG. 11 leads naturally to a division of the fiber optic cable interconnecting the terminals into two separate cables. One cable contains the fibers that are used to interconnect the transmission ports of the hybrid couplers and the other contains the fibers used to connect the reflection ports to the terminals. With this arrangement, the number of splices along a transmission path is $N_{SP}=A+B+3$ which results in a lower splice loss than in the transmission or reflection star networks.

The embodiments of the invention in which an exclusive property or privilege is claimed are defined as follows:

1. A serial data bus for interconnecting a plurality of terminals comprising six optical fibers arranged in two groups of three fibers each, said groups conducting light in mutually opposite directions, each terminal having light transmitting and receiving means connected to predetermined fibers by optical couplers, the transmitting means in each terminal being coupled to two of the fibers in each group of three fibers, the transmitting means of terminals adjacent any one terminal being connected to a different two fibers than the transmitting means of said one terminal.

2. A serial data bus as claimed in claim 1 wherein the receiving means in each terminal is coupled to the same two fibers in each group as the transmitting means.

3. An optical data bus for interconnecting a plurality of terminals comprising a plurality of hybrid transmission-reflection star couplers each having M transmission ports and N reflection ports, terminals each having transmitting and receiving means being optically coupled to at least some of said reflection ports and each of the hybrid star couplers being connected to the other star couplers by a different one of said M transmission ports.

4. An optical data bus as claimed in claim 3 wherein $M=2$ and $N=8$.

5. An optical data bus as claimed in claim 4 comprising three hybrid transmission-reflection star couplers and 24 terminals.

* * * * *